United States Patent
Soni et al.

(10) Patent No.: US 10,129,328 B2
(45) Date of Patent: Nov. 13, 2018

(54) CENTRALIZED MANAGEMENT OF WEBSERVICE RESOURCES IN AN ENTERPRISE

(71) Applicant: Oracle International Corporation, Redwood Shores, CA (US)

(72) Inventors: Rohit Soni, Burlington, MA (US); Atul Gupta, Ghaziabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 273 days.

(21) Appl. No.: 14/038,615

(22) Filed: Sep. 26, 2013

(65) Prior Publication Data

US 2015/0089018 A1    Mar. 26, 2015

(51) Int. Cl.
| | |
|---|---|
| G06F 15/16 | (2006.01) |
| H04L 29/08 | (2006.01) |
| H04L 12/26 | (2006.01) |
| G06F 17/30 | (2006.01) |
| G06F 9/50 | (2006.01) |

(52) U.S. Cl.
CPC ............ *H04L 67/10* (2013.01); *G06F 9/5022* (2013.01); *G06F 17/3089* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 7,865,535 | B2 * | 1/2011 | Brodsky | G06F 17/3089 707/709 |
| 7,996,427 | B1 * | 8/2011 | Flick | G06F 17/30997 707/792 |
| 8,627,293 | B2 * | 1/2014 | Perrone | G06F 9/455 717/127 |
| 2006/0129601 | A1 * | 6/2006 | Chang | G06F 8/60 |
| 2009/0024561 | A1 * | 1/2009 | Palanisamy | G06F 17/30174 |
| 2013/0036094 | A1 * | 2/2013 | Fippel | G06Q 10/06 707/640 |
| 2014/0280894 | A1 * | 9/2014 | Reynolds | H04L 43/0876 709/224 |

(Continued)

*Primary Examiner* — Aaron N Strange
*Assistant Examiner* — Mohammad Yousuf A. Mian
(74) *Attorney, Agent, or Firm* — Kilpatrick Townsend & Stockton LLP

(57) ABSTRACT

A single centralized metadata repository for an entire enterprise can maintain the metadata pertaining to various different web service applications on application servers of heterogeneous types within the enterprise. The metadata items stored in the centralized repository all can be stored in a same canonical format that can be expected and understood by all metadata accessors. The metadata maintained within the central repository can be given a life span that is linked with the life span of the web service application to which that metadata pertains. When a web service application is deployed on an application server, metadata pertaining to that webservice can be pushed automatically to the central repository for storage. When such a web service application is undeployed from an application server, the metadata pertaining to that webservice can be removed automatically from the central repository so as not to waste storage space.

23 Claims, 5 Drawing Sheets

(56) References Cited

U.S. PATENT DOCUMENTS

2014/0325503 A1\* 10/2014 Li .......................... G06F 11/34
  717/177
2015/0026828 A1\* 1/2015 Adams ................... G06F 21/64
  726/30

\* cited by examiner

CENTRALIZED MANAGEMENT OF WEBSERVICE RESOURCES IN AN ENTERPRISE

BACKGROUND

A business enterprise could involve multiple different kinds of application servers on which different applications could be deployed in order to service the needs of the business. These applications might be remotely accessible by business clients over a network using web services. Because the application servers can be of different kinds, the application servers can be said to be heterogeneous relative to each other. Each different kind of application server might store application metadata in a different format. Each different kind of application server might provide different techniques through which that application metadata could be accessed. Because of the potential diversity of application servers and web services, businesses operating such an enterprise often can feel the need to hire specialist administrators for the different kinds of application servers and different kinds of web services. Keeping a large staff of administrators employed for these purposes can become quite expensive.

In order to attempt to reduce costs, a business enterprise might desire, among other actions, to implement uniform security policies that can be applied to all of the web services in the enterprise. Potentially, each separate web service in the enterprise can be treated as an enterprise resource against which a set of enterprise-wide security policies and rules can be specified and enforced, thereby reducing the need for the business to maintain a large administrative staff. However, in order to implement this approach, the end point of each web service in the enterprise might need to be identified first. Each web service can have its own identifier that uniquely identifies that web service in the enterprise. Such an identifier can be derived from a web service's metadata, typically stored on an application server on which an application using the web service has been deployed. For example, each web service's identifier can be composed of a combination of the web service's name, the port that the web service uses, an operation name, etc. Such a combination of information can be gleaned from metadata stored at the application server.

However, because application server kinds can be diverse, as can be the techniques that each server permits in order to facilitate the gleaning of such metadata, obtaining the metadata from each separate application server can become a daunting task.

DETAILED DESCRIPTION

In the following description, for the purposes of explanation, specific details are set forth in order to provide a thorough understanding of embodiments of the invention. However, it will be apparent that the invention may be practiced without these specific details.

A single centralized metadata repository for an entire enterprise is discussed herein. The repository can maintain the metadata pertaining to various different web service applications on various application servers of heterogeneous types within the enterprise. Because all of the metadata can be stored in a single centralized repository, accessors of the metadata can access that metadata using a single set of access techniques that the repository provides. Thus, metadata accessors are not forced to deal with different kinds of application servers using different access techniques when obtaining such metadata.

Furthermore, the metadata items stored in the centralized repository all can be stored in a same canonical format that can be expected and understood by all metadata accessors. This canonical format can be different from the potentially variant formats in which the metadata items had been stored among the various different kinds of application servers. Translating the formats of the metadata items into the canonical format for storage in the centralized repository can ease the task that metadata accessors perform when obtaining those metadata items.

Additionally, the metadata maintained within the central repository can be given a life span that is linked with the life span of the web service application to which that metadata pertains. When a web service application is deployed on an application server, metadata pertaining to that webservice can be pushed automatically to the central repository for storage. Conversely, when such a web service application is undeployed from an application server, the metadata pertaining to that webservice can be removed automatically from the central repository so as not to waste storage space. In one embodiment of the invention, this automatic pushing of metadata and automatic removal of metadata from the central repository in response to the deployment and undeployment, respectively, of web service applications on application servers can be performed by native deployment plug-ins that reside and execute on those application servers. Such plug-ins can listen for deployment and undeployment events that application servers automatically generate when web service application deployments or undeployments occur, and can interact appropriately with the centralized repository in response to detecting those events in order to ensure that the proper metadata is maintained within that repository.

Figure 1:
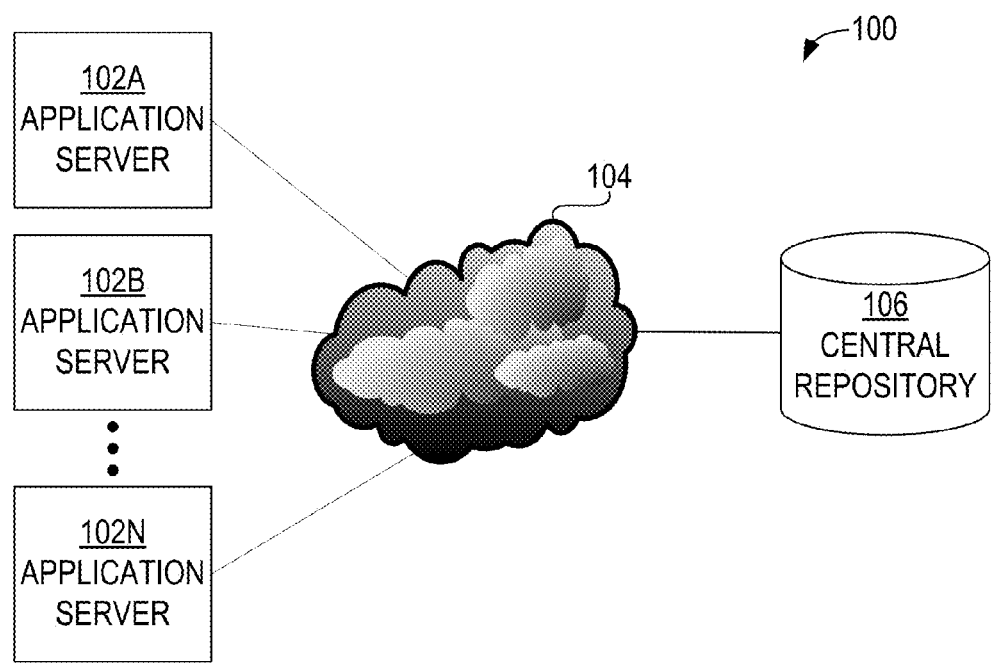
FIG. 1 is a block diagram that illustrates an example of a system in which native deployment plug-ins on application servers can send webservice metadata to a central repository, according to an embodiment of the invention.

FIG. 1 is a block diagram that illustrates an example of a system 100 in which native deployment plug-ins on application servers can send webservice metadata to a central repository, according to an embodiment of the invention. System 100 can include applications servers 102A-N, a network 104 (e.g., the Internet), and a central repository 106. Application servers 102A-N can be any kind of computing hardware, typically possessing one or more central processing units. Application servers 102A-N can execute different application server software instances. For example, some of application servers 102A-N might execute Websphere, some of application servers 102A-N might execute JBOSS, some of application servers 102A-N might execute Tomcat, and some of application servers 102A-N might execute Glassfish.

In an embodiment, at the time that an application is deployed on any particular application server within application servers 102A-N, that particular application server can generate a deployment event. A native deployment plug-in executing on the particular application server can detect the occurrence of the deployment event. In response to detecting the occurrence of the deployment event, the native deployment plug-in can automatically read webservice metadata that is stored on the particular application server. After reading this webservice metadata, the native deployment plug-in can automatically send the webservice metadata over network 104 to be stored in central repository 106 in a canonical format, which may differ from the format in which the webservice metadata was stored on the particular application server. In an embodiment of the invention, central repository 106 is not stored on or maintained by any of application servers 102A-N; central repository 106 can be stored on a completely separate computing device (or set of computing devices).

Figure 2:
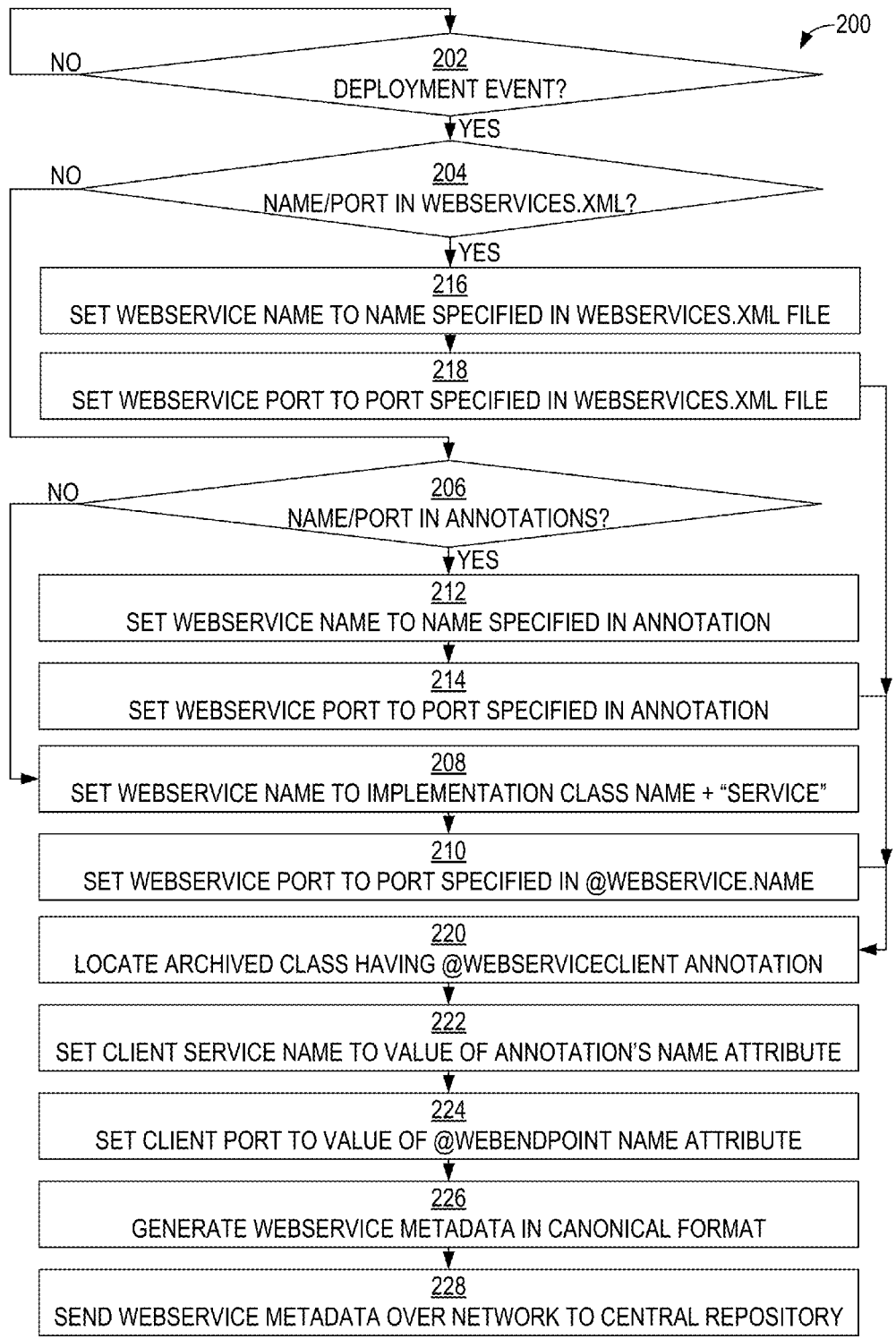
FIG. 2 is a flow diagram that illustrates an example of a technique through which a native deployment plug-in can obtain webservice metadata and push that webservice metadata to a central repository, according to an embodiment of the invention.

FIG. 2 is a flow diagram that illustrates an example of a technique 200 through which a native deployment plug-in can obtain webservice metadata and push that webservice metadata to a central repository, according to an embodiment of the invention. Alternative embodiments of the invention can involve additional, fewer, or different operations than those specifically shown in FIG. 2. Furthermore, alternative embodiments of the invention can involve such operations being performed in an order different from that specifically shown in FIG. 2. Technique 200 can be performed by a native deployment plug-in executing on any one of application servers 102A-N, for example.

In block 202, the plug-in can determine whether the application server has generated a deployment event in response to the deployment of an application on the application server. If the plug-in determines that the application server has generated a deployment event, then control passes to block 204. Otherwise, control passes back to block 202. In block 204, in response to determining that the application server has generated a deployment event, the plug-in can determine whether a standard webservices.xml file in an application archive for the application being deployed contains metadata specifying a webservice's name or port. If the plug-in determines that the standard webservices.xml file in the application archive for the application being deployed contains metadata specifying the webservice's name or port, then control passes to block 216. Otherwise, control passes to block 206.

In block 206, the plug-in can determine whether any @WebService or @WebServiceProvider annotations contain metadata specifying a webservice's name or port as an annotation attribute. In making this determination, the plug-in can use bytecode reader application programming interfaces. If the plug-in determines that a @WebService or @WebServiceProvider annotation contains metadata specifying the webservice's name or port, then control passes to block 212. Otherwise, control passes to block 208.

In block 208, the plug-in can set the name of the webservice to the simple name of the JAVA implementation class from the application archive, plus the word "Service." In block 210, the plug-in can set the port of the webservice to a port specified in @WebService.name. Control passes to block 220.

Alternatively, in block 212, the plug-in can set the name of the webservice to a webservice name specified in the @WebService or @WebServiceProvider annotation. In block 214, the plug-in can set the port of the webservice to a webservice port specified in the @WebService or @WebServiceProvider annotation. Control passes to block 220.

Alternatively, in block 216, the plug-in can set the name of the webservice to a webservice name specified in the standard webservices.xml file. In block 218, the plug-in can set the port of the webservice to a webservice port specified in the standard webservices.xml file. Control passes to block 220.

In block 220, the plug-in can locate, in the archive, a class having a @WebServiceClient annotation. In locating this class, the plug-in can use bytecode reader application programming interfaces. In block 222, the plug-in can set a client service name to a value of a "name" attribute in the @WebServiceClient annotation. In block 224, the plug-in can set a client port to a value of a "name" attribute of a @WebEndpoint annotation of the service implementation's method. In block 226, the plug-in can generate webservice metadata in a canonical format specifying the webservice's name and port and the client service's name and port. In block 228, the plug-in can send the webservice metadata over a network to the central repository. The central repository can be configured to store the webservice metadata in response to receiving it from the plug-in.

Using technique 200, two or more separate plug-ins on two or more different kinds (e.g., Websphere, JBOSS, Tomcat, Glassfish, etc.) of application servers each can automatically glean webservice metadata from the application servers on which those plug-ins reside. Each such plug-in can automatically cause such webservice metadata to be stored in a canonical format in the central repository. For example, a first plug-in on a first application server of a first kind can cause first webservice metadata to be stored in the central repository, while a second plug-in on a second application server of a second kind can cause second webservice metadata to be stored in the central repository.

Figure 3:
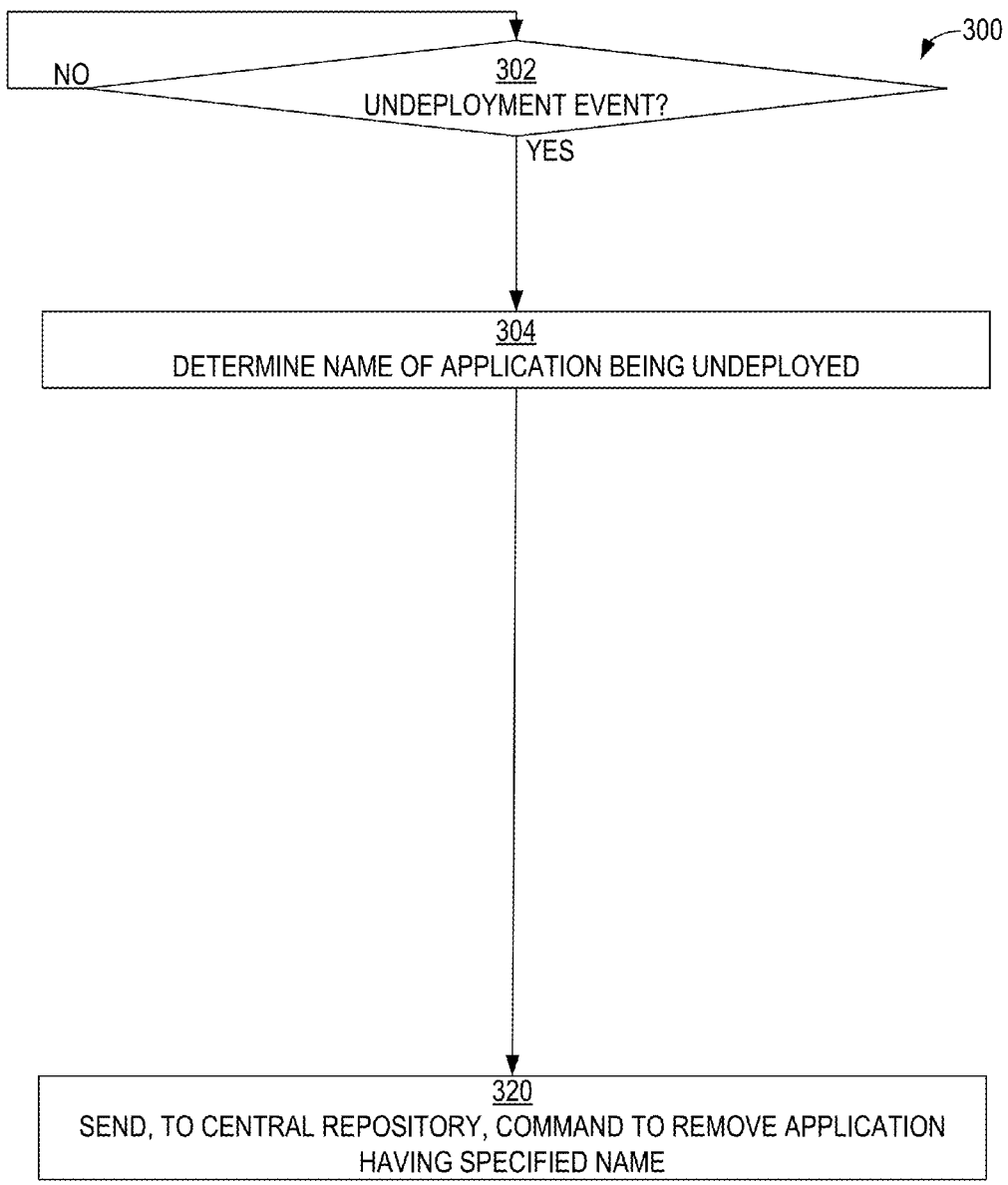
FIG. 3 is a flow diagram that illustrates an example of a technique through which a native deployment plug-in can instruct a central repository to remove, from the central repository, webservice metadata that is no longer being used, according to an embodiment of the invention.

FIG. 3 is a flow diagram that illustrates an example of a technique 300 through which a native deployment plug-in can instruct a central repository to remove, from the central repository, webservice metadata that is no longer being used, according to an embodiment of the invention. Alternative embodiments of the invention can involve additional, fewer, or different operations than those specifically shown in FIG. 3. Furthermore, alternative embodiments of the invention can involve such operations being performed in an order different from that specifically shown in FIG. 3. Technique 300 can be performed by a native deployment plug-in executing on any one of application servers 102A-N, for example.

In block 302, the plug-in can determine whether the application server has generated an undeployment event in response to the undeployment of an application on the application server. If the plug-in determines that the application server has generated an undeployment event, then control passes to block 304. Otherwise, control passes back to block 302. In block 304, in response to determining that the application server has generated an undeployment event, the plug-in can determine the name of the application being undeployed.

In block 320, the plug-in can send, over a network to the central repository, a command instructing the central repository to remove the named application. The central repository can be configured to remove the application so identified in response to receiving the command from the plug-in. In an embodiment, the webservice name and port name are not removed from the central repository; the application itself is removed from the central repository. Metadata associated with the application can be removed from the central repository in conjunction with the removal of the application.

Figure 4:
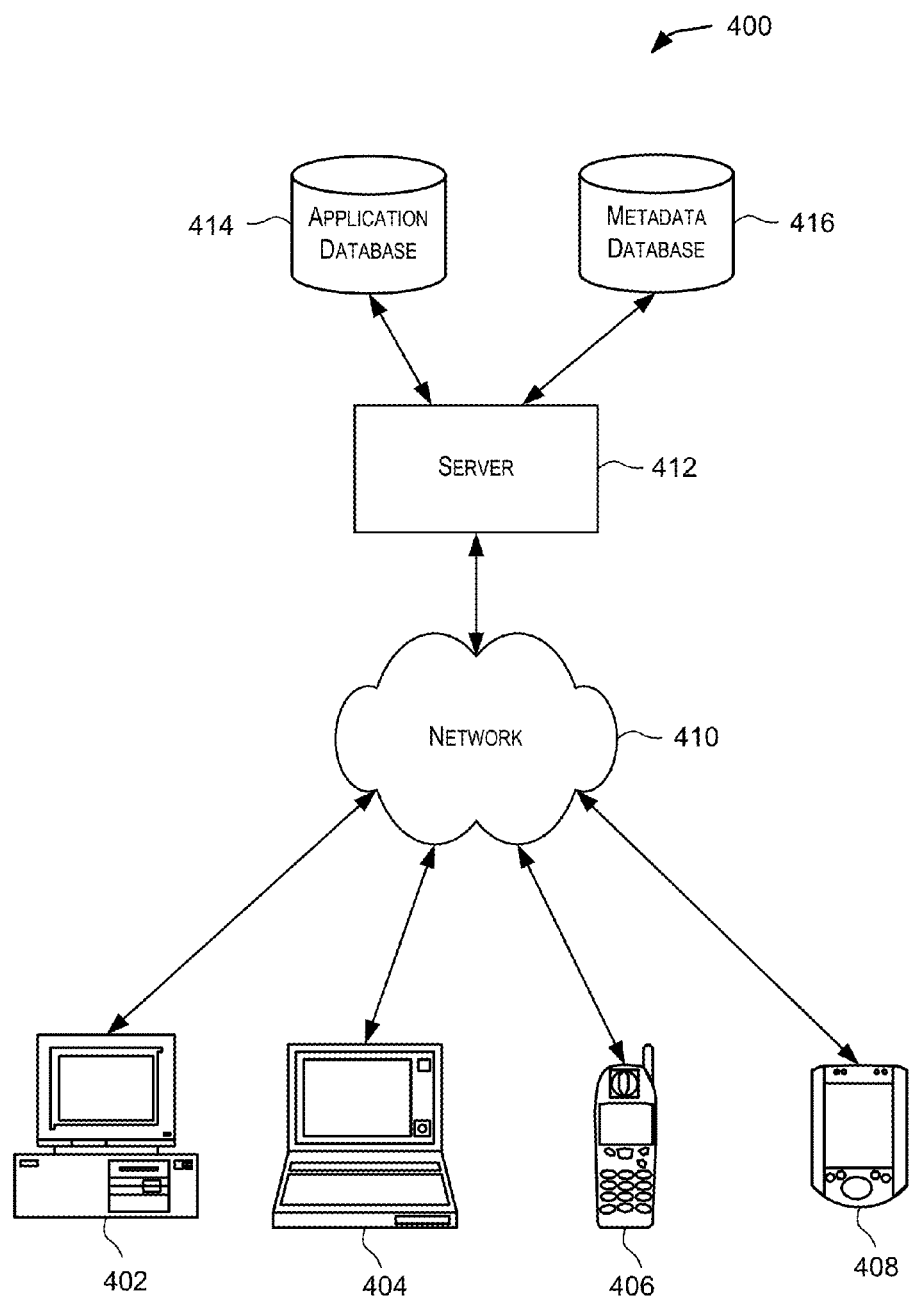
FIG. 4 is a simplified block diagram illustrating components of a system environment that may be used in accordance with an embodiment of the present invention.

FIG. 4 is a simplified block diagram illustrating components of a system environment 100 that may be used in accordance with an embodiment of the present invention. As shown, system environment 400 includes one or more client computing devices 402, 404, 406, 408, which are configured to operate client applications including native client applications and possibly other applications such as a web browser, or the like. In various embodiments, client computing devices 402, 404, 406, and 408 may interact with a server 412.

Client computing devices 402, 404, 406, 408 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 402, 404, 406, and 408 may be any other electronic device, such as a thin-client computer, Internet-enabled gaming system, and/or personal messaging device, capable of communicating over a network (e.g., network 410 described below). Although exemplary system environment 400 is shown with four client computing devices, any number of client computing devices may be supported. Other devices such as devices with sensors, etc. may interact with server 412.

System environment 400 may include a network 410. Network 410 may be any type of network familiar to those skilled in the art that can support data communications using any of a variety of commercially-available protocols, including without limitation TCP/IP, SNA, IPX, AppleTalk, and the like. Merely by way of example, network 410 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 400 also includes one or more server computers 412 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 412 may be adapted to run one or more services or software applications.

Server 412 may run an operating system including any of those discussed above, as well as any commercially available server operating system. Server 412 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 400 may also include one or more databases 414, 416. Databases 414, 416 may reside in a variety of locations. By way of example, one or more of databases 414, 416 may reside on a non-transitory storage medium local to (and/or resident in) server 412. Alternatively, databases 414, 416 may be remote from server 412, and in communication with server 412 via a network-based or dedicated connection. In one set of embodiments, databases 414, 416 may reside in a storage-area network (SAN) familiar to those skilled in the art. Similarly, any necessary files for performing the functions attributed to server 412 may be stored locally on server 412 and/or remotely, as appropriate. In one set of embodiments, databases 414, 416 may include relational databases, such as databases that are provided by Oracle and that are adapted to store, update, and retrieve data in response to SQL-formatted commands.

Figure 5:
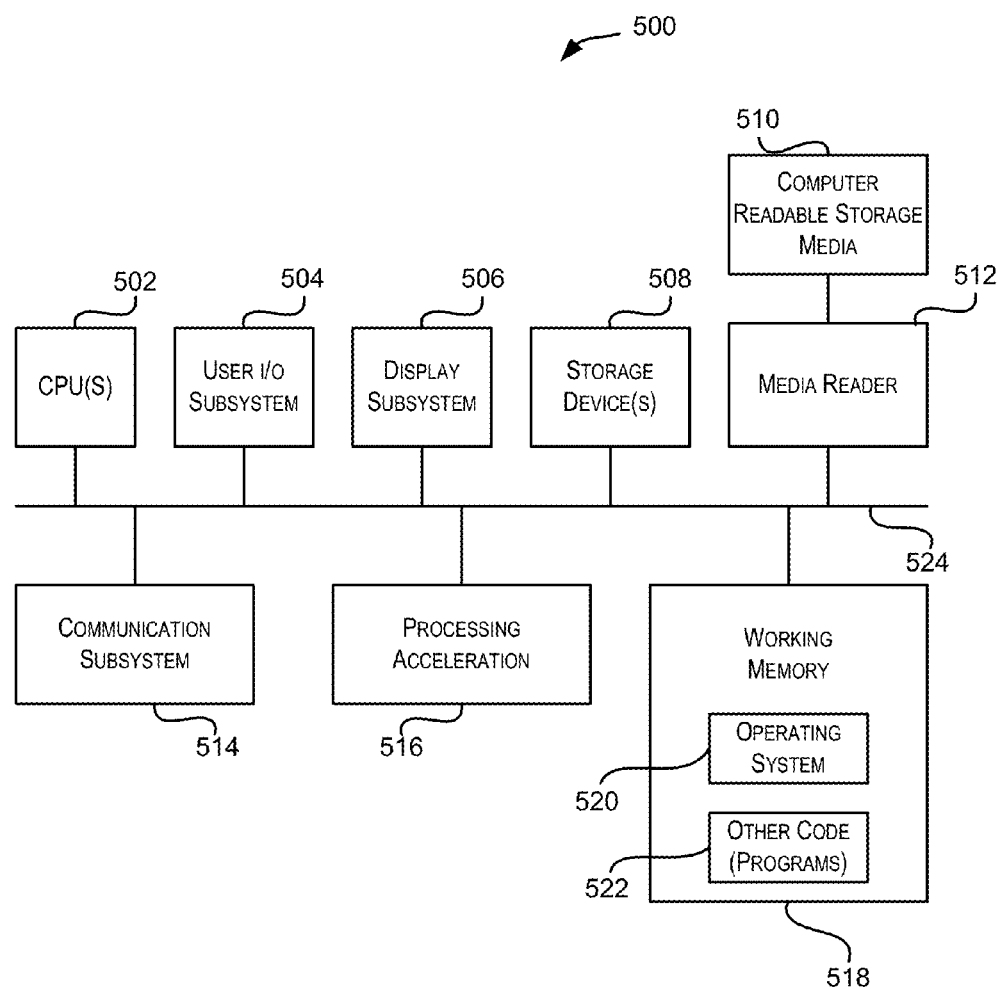
FIG. 5 is a simplified block diagram of a computer system that may be used in accordance with embodiments of the present invention.

FIG. 5 is a simplified block diagram of a computer system 500 that may be used in accordance with embodiments of the present invention. For example server 412 or clients 402, 404, 406, or 408 may be implemented using a system such as system 500. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). Computer system 500 may also include one or more storage devices 508. By way of example, the storage device(s) 508 may include devices such as disk drives, optical storage devices, and solid-state storage devices such as a random access memory (RAM) and/or a read-only memory (ROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 may permit data to be exchanged with network 410 and/or any other computer described above with respect to system environment 400.

Computer system 500 may also comprise software elements, shown as being currently located within working memory 518, including an operating system 520 and/or other code 522, such as an application program (which may be a client application, Web browser, mid-tier application, RDBMS, etc.). In an exemplary embodiment, working memory 518 may include executable code and associated data structures used for retrieving webservice metadata from an application server and storing that webservice metadata in a central repository automatically in response to a deployment event as described above. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
    determining, by a first application server, that a first webservice application has been deployed on the first application server;
    determining, by the first application server, first metadata stored on the first application server describing one or more attributes of the first webservice application, wherein an instance of the first webservice application is deployed on the first application server, wherein the first metadata is automatically read from the first application server;
    generating, by the first application server, second metadata using the first metadata, wherein the second metadata describes the one or more attributes of the first webservice application as deployed on the first application server using a canonical format different from the first metadata; and
    communicating, by the first application server, the second metadata to a central repository, wherein the central repository is separate from and is not maintained by the first application server,
    wherein the central repository is configured to:
        store the second metadata that is generated using the first metadata, wherein metadata, from a plurality of different application servers, that is stored in the central repository is saved in a same canonical format, wherein the second metadata comprises a name of a webservice and a port of the webservice, and wherein the name of the webservice and the port of the webservice for the plurality of different application servers are stored in the same canonical format,
        wherein the metadata that is stored in the central repository is linked to webservice applications deployed on the plurality of application servers for a life span of the webservice applications;
        communicate with a plurality of application servers in a service application system; and
        receive requests to obtain the stored metadata linked to webservice applications deployed on the plurality of application servers, wherein the requests for the stored metadata linked to webservice applications deployed on the plurality of application servers are implemented via a same access technique using the same canonical format for metadata that is stored in the central repository.

2. The computer-implemented method of claim 1, further comprising:
    determining, by a second application server that is separate from the first application server, that a second webservice application has been deployed on the second application server;
    generating, by the second application server, third metadata describing one or more attributes of the second webservice application as deployed on the second application server; and
    communicating, by the second application server, fourth metadata generated using the third metadata and the canonical format to the central repository.

3. The computer-implemented method of claim 2, wherein the first application server is of a first server type selected from a set of server types consisting of Websphere, JBOSS, Tomcat, and Glassfish; and wherein the second application server is of a second server type, different from the first server type, selected from the set.

4. The computer-implemented method of claim 2, further comprising:
    storing the second metadata in the canonical format at the central repository; and
    storing the fourth metadata in the canonical format at the central repository.

5. The computer-implemented method of claim 1, further comprising:
    determining that the first webservice application has been undeployed from the first application server; and
    in response to determining that the first webservice application has been undeployed from the first application server, automatically removing the second metadata from the central repository.

6. The computer-implemented method of claim 1, wherein determining the first metadata comprises reading information from an application archive from which the first webservice application is deployed.

7. A computer-readable storage memory storing a plurality of instructions which, when executed by one or more processors, cause the one or more processors to perform operations comprising:

receiving, at a computer hosting a central repository, first webservice metadata from a first application server storing the first webservice metadata of a first webservice application sent over a computer network to the central repository as part of a first deployment process, on the first application server, an instance of the first webservice application to which the first webservice metadata pertains;

receiving, at the computer hosting the central repository, second webservice metadata from a second application server other than the first application server sent over the network to the central repository as part of a second deployment process, on the second application server, of a second webservice application to which the second webservice metadata pertains, wherein the first application server and the second application server are in a service application system; and making the first and second webservice metadata stored in the central repository accessible to clients that interact with the central repository, wherein the central repository is configured to:

store the first webservice metadata linked to the first webservice application in the central repository for a life span of the first webservice application;

store the second webservice metadata linked to the second webservice application in the central repository for a life span of the second webservice application, wherein webservice metadata, from a plurality of different application servers, that is stored in the central repository is saved in a same canonical format, wherein the first metadata and the second metadata comprises a name of a webservice and a port of the webservice, and wherein the name of the webservice and the port of the webservice for the plurality of different application servers are stored in the same canonical format; and receive a request to obtain one of the stored first webservice metadata linked to the first webservice application and the stored second webservice metadata linked to the second webservice application, wherein the request for one of the stored first webservice metadata linked to the first webservice application and the stored second webservice metadata linked to the second webservice application is implemented via a same access technique using the same canonical format for metadata that is stored in the central repository.

8. The computer-readable storage memory of claim 7, wherein the first application server is of a first server type selected from a set of server types consisting of Websphere, JBOSS, Tomcat, and Glassfish; and wherein the second application server is of a second server type, different from the first server type, selected from the set.

9. The computer-readable storage memory of claim 7, wherein storing the first webservice metadata comprises storing the first webservice metadata in a canonical format that differs from a first format in which the first webservice metadata was stored on the first application server; and wherein storing the second webservice metadata comprises storing the second webservice metadata in the canonical format, which also differs from a second format in which the second webservice metadata was stored on from the second application server.

10. The computer-readable storage memory of claim 7, wherein the operations further comprise:

receiving, at the central repository, over a network, a command that the first application server sent in response to the first webservice application being undeployed from the first application server; and removing the first web service metadata from the central repository in response to receiving the command.

11. The computer-readable storage memory of claim 7, wherein receiving the first webservice metadata comprises receiving webservice metadata that the first application server read from an application archive from which the first webservice application is being deployed.

12. The computer-readable storage memory of claim 7, wherein receiving the first webservice metadata comprises receiving webservice metadata from a native deployment plug-in that executes on the first application server and detects deployment events.

13. A system comprising:

a memory; and a processor that is coupled to the memory and that is configured to:

receive, at a central repository, first webservice metadata from a first application server storing the first webservice metadata of a first webservice application sent over a computer network to the central repository as part of a first deployment process, on the first application server, an instance of the first webservice application to which the first webservice metadata pertains;

receive, at the central repository, second webservice metadata from a second application server other than the first application server sent over the network to the central repository as part of a second deployment process, on the second application server, of a second webservice application to which the second webservice metadata pertains, wherein the first application server and the second application server are in a service application system; and make the first and second webservice metadata stored in the central repository accessible to clients that interact with the central repository, wherein the central repository is configured to:

store the first webservice metadata linked to the first webservice application in the central repository for a life span of the first webservice application;

store the second webservice metadata linked to the second webservice application in the central repository for a life span of the second webservice application, wherein webservice metadata, from a plurality of different application servers, that is stored in the central repository is saved in a same canonical format, wherein the first metadata and the second metadata comprises a name of a webservice and a port of the webservice, and wherein the name of the webservice and the port of the webservice for the plurality of different application servers are stored in the same canonical format; and receive a request to obtain one of the stored first webservice metadata linked to the first webservice application and the stored second webservice metadata linked to the second webservice applications, wherein the request for one of the stored first webservice metadata linked to the first webservice application and the stored second webservice metadata linked to the second webservice application is implemented via a same access technique using the same canonical format for metadata that is stored in the central repository.

14. The system of claim 13, wherein the first application server is of a first server type selected from a set of server types consisting of Websphere, JBOSS, Tomcat, and Glassfish; and wherein the second application server is of a second server type, different from the first server type, selected from the set.

15. The system of claim 13, wherein the processor is configured to store the first webservice metadata in a canonical format that differs from a first format in which the first webservice metadata was stored on the first application server; and wherein the processor is configured to store the second webservice metadata in the canonical format, which also differs from a second format in which the second webservice metadata was stored on from the second application server.

16. The system of claim 13, wherein the processor is configured to:
receive, at the central repository, over a network, a command that the first application server sent in response to the first webservice application being undeployed from the first application server; and
remove the first webservice metadata from the central repository in response to receiving the command.

17. The system of claim 13, wherein the processor is configured to receive the first webservice metadata from a native plug-in which, in response to detecting an event that indicated that the first webservice application was being deployed, read the first webservice metadata from an application archive from which the first webservice application was being deployed.

18. The method of claim 1, wherein the central repository is separate from the plurality of application servers.

19. The method of claim 1, wherein the canonical format specifies a webservice name and port.

20. The method of claim 1, wherein a plurality of metadata stored in the central repository are stored in a same canonical format.

21. The computer-readable storage memory according to claim 7, wherein the central repository is separate from and is not maintained by the first application server and the second application server.

22. The method according to claim 1, wherein the first metadata comprises a webservice identifier that uniquely identifies the first webservice application.

23. The method according to claim 2, wherein the first application server and the second application server are heterogeneous type application servers.

* * * * *

UNITED STATES PATENT AND TRADEMARK OFFICE
CERTIFICATE OF CORRECTION

PATENT NO. : 10,129,328 B2
APPLICATION NO. : 14/038615
DATED : November 13, 2018
INVENTOR(S) : Soni et al.

Page 1 of 1

It is certified that error appears in the above-identified patent and that said Letters Patent is hereby corrected as shown below:

In the Claims

In Column 10, Line 5, in Claim 10, delete "web service" and insert -- webservice --, therefor.

Signed and Sealed this
Fifth Day of November, 2019

Andrei Iancu
*Director of the United States Patent and Trademark Office*